United States Patent [19]

Trittipoe

[11] 4,162,570

[45] Jul. 31, 1979

[54] METHOD AND APPARATUS FOR SEPARATING A FITTING FROM A TUBE

[75] Inventor: Jack H. Trittipoe, Elwood, Ill.

[73] Assignee: Caterpillar Tractor Co., Peoria, Ill.

[21] Appl. No.: 881,288

[22] Filed: Feb. 27, 1978

[51] Int. Cl.² ............................................. B23P 19/04
[52] U.S. Cl. ........................................ 29/427; 29/237; 72/412
[58] Field of Search ................. 29/427, 234, 237, 280, 29/282; 81/3 G, 3 R; 72/414, 415, 470, 410, 412, 416

[56] References Cited

U.S. PATENT DOCUMENTS

| | | | |
|---|---|---|---|
| 2,744,429 | 5/1956 | Seely | 72/412 X |
| 3,146,519 | 9/1964 | Redwine | 72/416 X |
| 3,176,384 | 4/1965 | Johnson | 29/280 |

Primary Examiner—Milton S. Mehr
Attorney, Agent, or Firm—John W. Grant

[57] ABSTRACT

A method of separating a fitting from a tube which is mechanically joined to the fitting includes collapsing the tube between a pair of die members positioned adjacent the fitting and thereafter removing the fitting from the collapsed tube.

3 Claims, 3 Drawing Figures

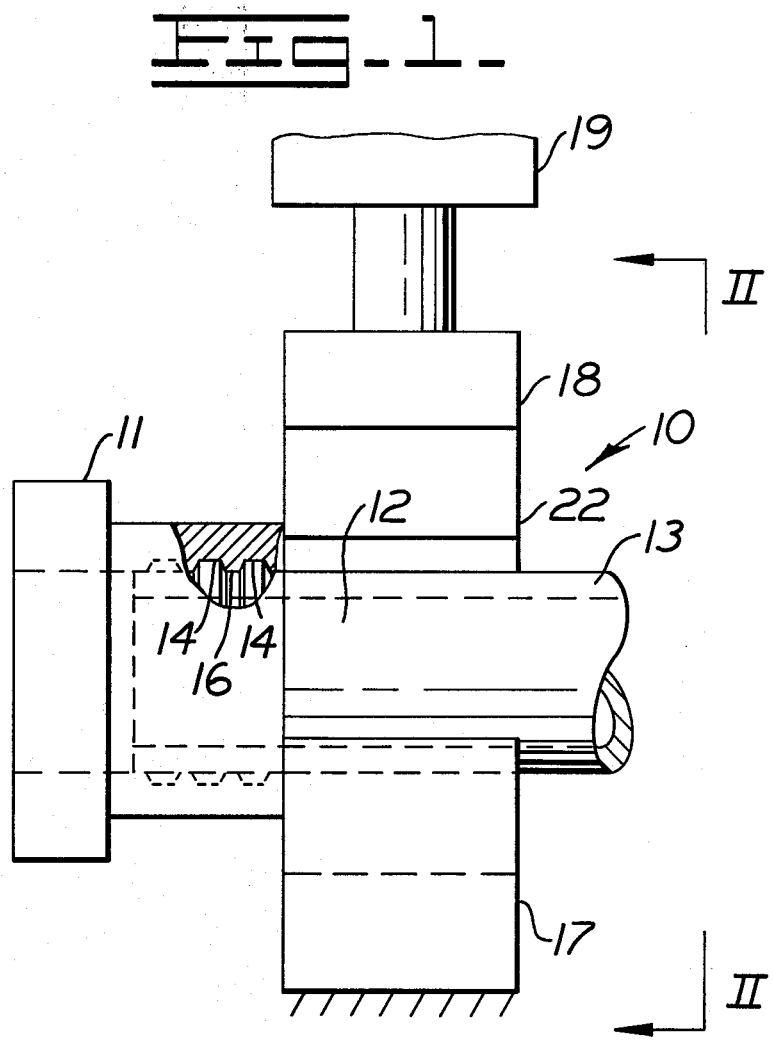

METHOD AND APPARATUS FOR SEPARATING A FITTING FROM A TUBE

BACKGROUND OF THE INVENTION

This invention relates to a method of separating a fitting from an end portion of a tube which are mechanically joined together.

Many tube assemblies have a fitting such as a flange or elbow mechanically joined to an end portion of a metal tube. In one method of joining the tube and fitting, the tube is swaged into grooves formed in the bore of the fitting. Such fittings are normally castings and since several machining steps are required to manufacture such fittings, they are rather expensive with some costing up to 40 to 50 dollars. One of the problems associated with these tube assemblies is that of salvaging the fitting for reuse when the tube becomes damaged or broken or if the tube assembly is improperly formed during manufacturing.

SUMMARY OF THE INVENTION

The present invention is directed to overcoming one or more of the problems as set forth above.

According to the present invention, this is accomplished by providing a method of separating a fitting from an end portion of a tube extending into and mechanically joined to the fitting. Such method includes moving one of a pair of die members toward the other die member for collapsing the end portion of the tube. With the end portion of the tube collapsed, the fitting is then easily removed from the tube.

BRIEF DESCRIPTION OF THE DRAWINGS

FIG. 1 is a diagrammatic side elevational view of an apparatus for performing the method of the present invention.

FIG. 2 is a sectional view taken along line II—II of FIG. 1.

FIG. 3 is a view similar to FIG. 2 with certain elements in an actuated position.

DETAILED DESCRIPTION

Referring now to the drawing, an apparatus 10 is provided for carrying out a method of separating a fitting, for example a flange 11, from an end portion 12 of a metal tube 13 which extends into and is mechanically joined to the fitting. In the illustration shown, a plurality of annular grooves 14 are provided in a bore 16 of the fitting 11 and the tube is swaged into the grooves such that the tube and fitting are mechanically joined forming a tube assembly. As shown in FIG. 2, the tube has an inside diameter "D" and a wall thickness "T".

The apparatus 10 includes a stationary die member 17, a movable die member 18, and a means, for example, a fluid jack 19 connected to the movable die member for moving it toward and away from the stationary die member. The stationary die member is provided with a slot 21 having a width "A". The width "A" is preferably about equal to the inside diameter of the tube.

The movable die member is provided with a projection 22 positioned for entry into the slot 21 as the movable die member 18 is moved toward the stationary die member 17. The projection has a width "B" which is preferably about 10% less than width "A" minus 2"T".

The method of separating the fitting 10 from the end portion 12 of the tube 13 which extends into and is mechanically joined to the fitting 11 is initiated by first positioning the tube upon the stationary die member 17 between the slot 21 and the projection 22. The fitting is positioned adjacent the stationary die member and preferably is in abutment therewith. The movable die member is then moved toward the stationary die member by extending the fluid jack 19. The projection 22 thereby forces the tube into the slot resulting in collapsing the end portion of the tube. By collapsing the end portion of the tube, the size thereof is decreased thereby breaking the mechanical connection between the tube and the fitting. The fitting is then easily removed from the collapsed end portion.

In view of the above, it is apparent that the present invention provides an improved method of salvaging for reuse a fitting which is mechanically joined to a tube. By collapsing the tube between a pair of die members, the fitting can be separated from the collapsed end portion without damage to the grooves or bore of the fitting. The fitting can then be reused by joining it to another tube.

Other aspects, objects and advantages of this invention can be obtained from a study of the drawings, the disclosure, and the appended claims.

The embodiments of the invention in which an exclusive property or privilege is claimed are defined as follows:

1. A method of separating a fitting from an end portion of a tube which extends into and is mechanically joined to the fitting, comprising the steps of:
   positioning the tube between a pair of die members;
   moving one of the die members toward the other die member and collapsing the end portion of the tube sufficiently for breaking the mechanical connection between the end portion of the tube and the fitting; and
   removing the fitting from the collapsed end portion of the tube.

2. The method of claim 1 wherein said positioning step includes abutting the fitting against one of the die members.

3. A method of separating a fitting from an end portion of a tube extending into and which is mechanically joined to the fitting, comprising the steps of:
   providing one of a pair of die members with a slot having a width "A" substantially equal to the inside diameter of the tube;
   providing the other die member with a projection having a thickness about 10% less than width A minus twice the wall thickness of the tube;
   positioning the tube between said pair of die members;
   moving one of the die members toward the other die member and collapsing the end portion of the tube to a size sufficient for breaking the mechanical connection between the end portion of the tube and the fitting; and
   removing the fitting from the collapsed end portion of the tube.

* * * * *